United States Patent [19]

Muench

[11] 4,117,537
[45] Sep. 26, 1978

[54] SYSTEM AND METHOD FOR LIMITING ENERGY CONSUMPTION

[75] Inventor: Paul William Muench, Medford Lakes, N.J.

[73] Assignee: Borg-Warner Corporation, Chicago, Ill.

[21] Appl. No.: 767,238

[22] Filed: Feb. 9, 1977

[51] Int. Cl.² .................... H02J 1/10; G05B 11/06
[52] U.S. Cl. ................................ 364/492; 307/85; 307/57
[58] Field of Search ............... 235/151.21; 307/52–60, 307/85–87; 340/163

[56] References Cited

U.S. PATENT DOCUMENTS

| | | | |
|---|---|---|---|
| 3,068,796 | 12/1962 | Pfluger et al. | 103/11 |
| 3,387,121 | 6/1978 | Maczuzak et al. | 235/151.21 |
| 3,505,508 | 4/1970 | Leyde | 235/151.31 |
| 3,522,421 | 8/1970 | Miller | 235/151.21 |
| 3,659,114 | 4/1972 | Polenz | 307/52 |
| 3,872,286 | 3/1975 | Putman | 235/151.21 |

Primary Examiner—Edward J. Wise

Attorney, Agent, or Firm—James J. Jennings, Jr.

[57] ABSTRACT

A demand limiting system is provided for a large electrical energy customer with at least one modulating load. A master control unit continually compares the actual power usage to the desired rate of power usage. When the desired power consumption rate is exceeded by a first amount, the master provides a hold signal to an associated slave control unit, which prevents further loading of the modulating load. When the desired rate of power consumption is exceeded by a second amount, the master provides a reduce signal to the slave unit, which begins to reduce the load. While the hold signal is calling for a reduced load, only a fraction of the time is utilized to reduce the load, and the remainder of the time the modulating load is in the hold condition, allowing the system to stabilize and prevent hunting. The reduce signal also regulates load shedding equipment, to disconnect non-critical loads. A safety and alarm circuit provides various audible indications and/or shut-down operations responsive to detection of various fault conditions.

31 Claims, 6 Drawing Figures

FIG. 1
Building Load Profile Without Control

FIG. 2
Building Load Profile With Demand Control

SYSTEM AND METHOD FOR LIMITING ENERGY CONSUMPTION

BACKGROUND OF THE INVENTION

Unlike charges for residential electric bills, based simply on consumption, the bills rendered for commercial and industrial installations comprise not only an actual energy consumption charge but also a demand charge. The energy usage charge is determined by metering the amount of electrical energy consumed during a billing period. The demand charge is a factor determined by the highest power consumption level during any given time interval, usually a 15 or 30 minute interval, during that billing period. Further the demand charge may have been set at some peak power usage time (usually in the summer) and be applied to the customer's bill for the next year. It is not unusual for the demand charge to represent as much as 45% of the total monthly billing. The utility companies follow this procedure because their generating installations and distribution networks must be capable of producing and supplying power at the peak demand times, irrespective of the reduced loads in the remainder of the year.

For these reasons various attempts have been made to limit the actual power consumption by industrial users and others. This is generally termed "demand limiting", although it limits the actual consumption, because it affects the demand portion of the utility bill. Initially various control manufacturers produced devices to monitor power consumption levels, and shed (that is, turn off) nonessential electrical loads as the power consumption approaches a peak demand. This brute-force approach of turn-on and turn-off is adequate for lights, small motors, and various electrical appliances that admit of such cycling control. However certain large installations, such as a centrifugal compressor motor and many large induction motors, are not designed for such on-off cycling. A centrifugal compressor, by way of example, is designed for modulating control by regulating the position of the prerotation vanes (PRV), which are sometimes termed inlet guide vanes. Regulating the vane position controls the amount of refrigerant gas admitted to the compressor, and thus the load. Regulating the large electrical motor which drives the compressor by switching it on and off to regulate the power consumption is not permissible, and in fact has led to compressor motor burnout and starting equipment failure where conventional on-off load shedding equipment has been connected in an attempt to regulate a modulating load.

It is therefore a primary object of the present invention to provide a demand regulating system where the customer installation includes a modulating electrical load, such as a centrifugal compressor. The invention will thus be described in connection with such an arrangement wherein the circuit which supplies power over the bus to the compressor motor is not changed, but a modulating signal to the motor which drives the prerotation vanes is regulated. Those skilled in the art will appreciate the application of this invention to related electrical energy systems, such as an inverter-motor combination wherein the bus voltage to the inverter is maintained but the switching frequency of the inverter thyristors is regulated to reduce the load.

When regulating a load limiting system in which a centrifugal compressor with a PRV motor to regulate the vane position is provided, it is possible to prevent further loading of the compressor by blocking the application of an increase-load signal to the PRV motor. However previous attempts to regulate load reduction have not proved feasible. For one thing, a given increment of PRV movement when the vanes are wide open does not produce a change in load equivalent to that attained by a similar movement when the vanes are already half closed. Thus a 5% change in the vane position when the vanes are initially wide open may produce virtually no effect on the load, but a 5% reduction when the vanes are already only 40% open could well send the compressor into surge and damage the system.

It is therefore another important object of the invention to provide a demand regulating system for an installation including a centrifugal compressor, in which load reduction is achieved in an effective manner over the system operating range without damaging the system.

Another important object of the invention is to provide such a system in which a plurality of slave control units, all regulated from one master unit, themselves regulate a corresponding plurality of modulating loads.

A corollary object of the invention is to provide such regulation of the plurality of modulating loads, in which the different slave units can be individually adjusted to afford load reductions at different rates in response to a single reduce signal from the master unit.

A further important object of the invention is the provision of fail-safe and alarm circuits to prevent power consumption in the event the control system loses power from the main bus, or loses the power-consumption indicating signal from the utility, or the system stays in the reduce-load mode for too long a time period, or the connection between the master unit and the slave control unit is broken.

SUMMARY OF THE INVENTION

The present invention is a demand regulating system for controlling the amount of power transferred over a power bus to an installation including at least one modulating electrical load. The system includes a master control unit, comprising first and second up-down counters, and has means for applying to both counters an actual power usage signal denoting the amount of power transferred over the power bus to the installation. The master control unit also includes pulse means for applying a periodic signal, denoting the desired rate of power usage, to both counters. The first counter is connected to provide a "hold" signal when it accumulates a firt total indicating the desired power usage rate has been exceeded by a first amount. The second counter is connected to provide a "reduce" signal when the second counter accumulates a second total indicating the desired power usage rate has been exceeded by a second amount, which is greater than the first amount.

The system also has a slave control unit, which is connecte to pass a load-increase or load-decrease signal to the modulating electrical load under normal conditions. In the slave control unit is a first means connected to prevent application of a load-increase signal to the modulating load responsive to receipt of a "hold" signal from the first counter in the master control unit. The slave control unit also has a second means connected to apply a reduce-load signal to the modulating load responsive to receipt of a "reduce" signal from the second counter in the master control unit.

In accordance with a significant feature of the invention, the slave control unit can be connected such that, upon receipt of the "reduce" signal from the master control unit, a reduce-load signal is passed to the modulating load only for a pre-set time, to allow the system to stabilize at the new load condition. This can be done with an adjustable relay, operative upon receipt of the "reduce" signal from the master control unit, to pass the reduce-load signal to the modulating load only for an initial portion of a given time period, and to pass no signal to the modulating load during the remainder of the given time period, to afford a gradual reduction in the loading over a succession of time periods.

THE DRAWINGS

In the several figures of the drawings, like reference numerals identify like components, and in those drawings.

GENERAL BACKGROUND DESCRIPTION

Figure 1:
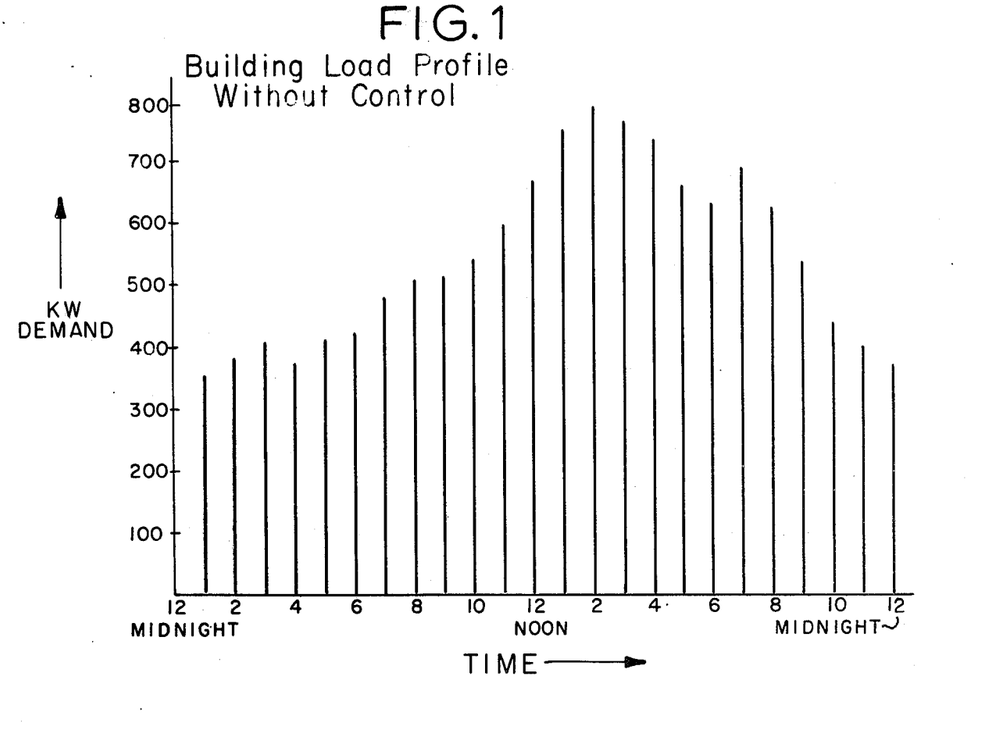
FIG. 1 is a bar graph depicting the electrical energy consumption of a commercial installation over a 24 hour period.

FIG. 1 depicts a typical electrical load profile of the energy consumed by an installation such as a commercial building, taken on the heaviest electrical consumption day in mid-summer. This represents the data recorded by the demand meter of the utility supplying this particular installation. The bar graph shows a peak demand of 800 kilowatts at 2 p.m. in this 24-hour interval. Even is this demand peak did not actually occur again for another year, the fact that it has occurred sets the basis for the demand charge against the customer for the next billing period, which may include the next full year and is usually never less than a three-month period. Accordingly it is desirable to develop some system for limiting the demand at the particular installation. In the past this has been attempted by merely changing the thermostat setting or some other control function, but this is generally rendered useless because some occupant notices the changes in setting and returns it to its usual position.

Figure 2:
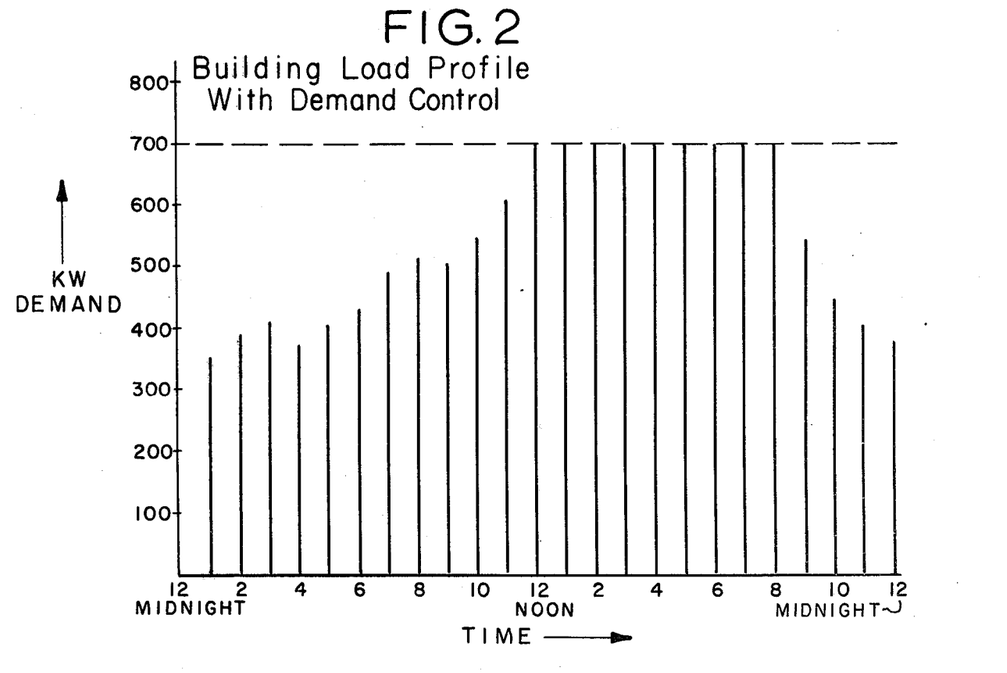
FIG. 2 is another bar graph, depicting the energy consumption over the same period after the installation has been modified by the addition of this invention.

Suppose the peak demand could be cut from 800 to 700 kilowatts, providing the maximum power consumption as shown in FIG. 2. This in fact places a ceiling on the demand of a particular installation. This represents a reduction of only 13% of actual energy consumed in the peak period, but because this sets the demand charge for the next billing period, the ultimate saving can approach 45%. This saving was in fact achieved with the system of this invention, which will now be described.

DETAILED DESCRIPTION OF THE INVENTION

Figure 3:
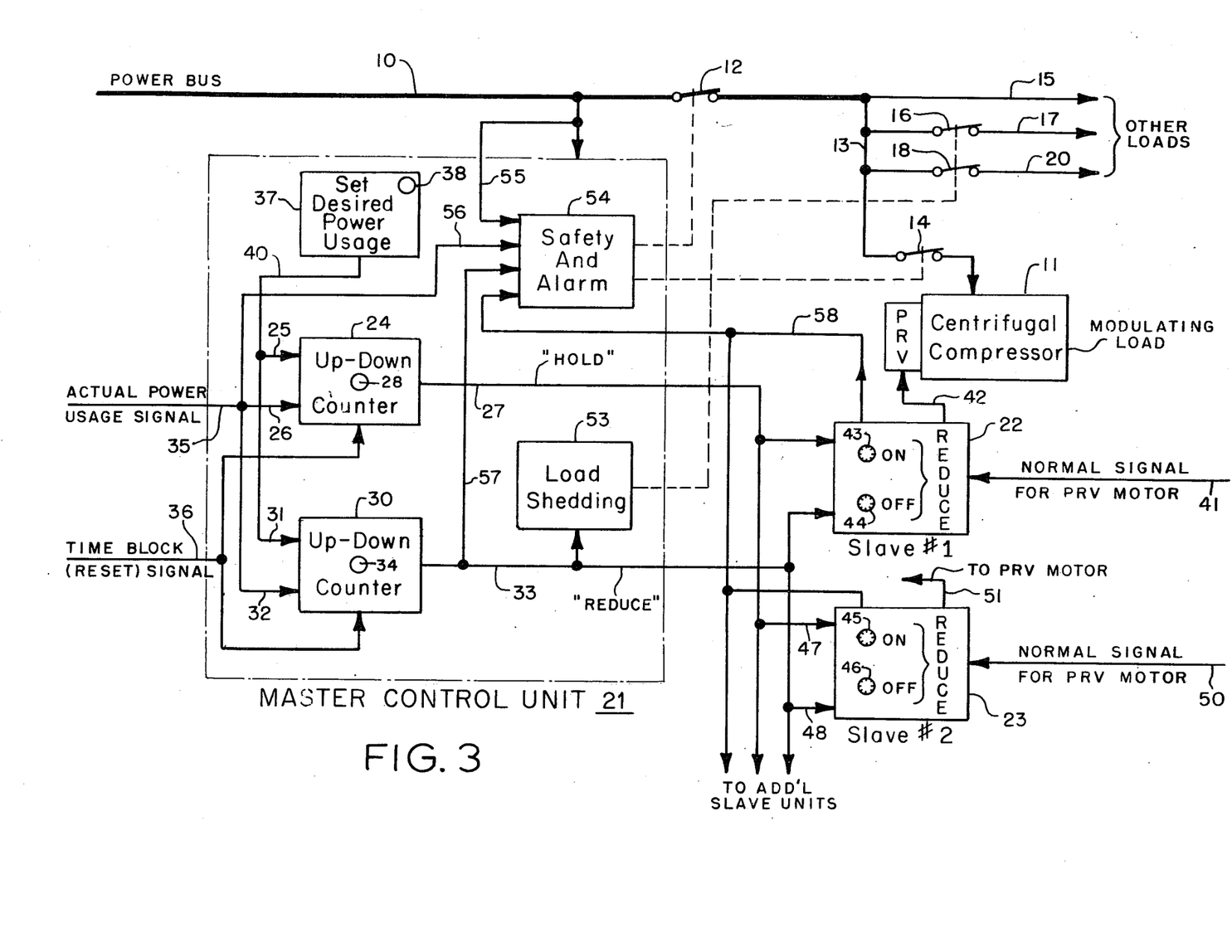
FIG. 3 is a block diagram depicting major components of the demand regulating system of this invention.

FIG. 3 shows major components of the present invention used in connection with a system for regulating demand of the electrical energy passed over a power bus 10 to a commercial installation, which includes at least one modulating load shown as a centrifugal compressor 11. The motor driving the compressor is considered a part of this block and thus is not shown separately. Under normal conditons electrical energy passes over the bus 10, main power interrupter 12, feeder line 13 and contractor 14 to supply energy to the centrifugal compressor motor. At the same time energy passes over line 15 to one of the additional loads in the installation, which may be critical lighting such as fire exit illumination and thus is not capable of normal load shedding. Energy from the feeder line 13 also passes over contactor 16 and line 17, and contactor 18 and line 20, to loads such as conventional light, appliances or similar items which can be dropped in an on-off manner as the demand limit is approached. Under normal operating conditions energy is applied as just described unless the preset level of 700 kilowatts (the value in this example) is approached, and there will be no modification of the normal power usage by the customer.

In accordance with the present invention, the demand regulating system includes a master control unit 21, and at least one slave control unit 22. It will become apparent from the subsequent description additional slave units such as 23 can be added to regulate additional modulating loads from the same master control unit 21. The master control unit comprises a first up-down counter 24 which continually accumulates the pulses received over lines 25 and 26. The pulses on line 25 are added, and the pulses on line 26 are subtracted, so that counter 24 always registers a net amount or algebraic total of the pulses received. When the accumulated count indicates the number of pulses received on line 26 has exceeded that received on line 25 in a given time period by a preset amount, an output signal is provided on line 27. In this explanation this output signal is termed a "hold" signal. The amount by which the pulses on line 26 must exceed that on line 25 to produce the hold signal is adjustable, and knob 28 provides access to that circuit arrangement for regulating this amount.

A second up-down counter 30 is also provided. This counter receives a first train of pulses on its input line 31, subtracts from this value the number of pulses received over its other line 32 in any given time period, and, when the pulses on line 32 exceed those on line 31 by a second amount (which is greater than the first amount registered in counter 24), the second counter 30 provides an output signal on line 33. This is termed "reduce" signal in this explanation. An adjusting knob 34 is provided in the second counter 30 to regulate the second total, or the amount by which the pulses on line 32 must exceed the pulses on line 31 in a given period so that counter 30 will provide the reduce output signal on line 33.

Conductor 35 represents means for applying to both counters an actual power usage signal which denotes the amount of power transferred over the power bus 10 from the utility to the customer's installation. This signal is normally provided to the customer, when he requests it, because it is in the interest of the utility to cooperate with the customer in limiting the peak demand and thus hold down the cost of the generating apparatus and distribution network which must be installed by the utility. In the same way the signal on line 36 is a time-block signal supplied by the utility, designating the beginning of the 15 or 30 minute time period over which the demand is metered. If this signal is not provided, it is possible to provide a pulse generator at the master control unit to supply a substitute timing signal.

In the master control unit is a pulser circuit 37 with an adjusting knob 38 to set the rate at which pulses are issued from this oscillator circuit over line 40. It is thus apparent that the pulser 37 represents means for applying to the counters a periodic signal denoting the desired rate of power usage. This desired-rate signal on line 40 is applied over line 25 to the hold counter 24, and over line 31 to the reduce counter 30. At the same time another train of pulses, representing the actual power used by the customer, is being received over line 35 and applied over line 26 to the hold counter 24, and over line 32 to the reduce counter 30.

Assuming the actual power usage signals on line 35 exceed the number of desired-rate pulses applied to the hold counter 24 in a given period, by an amount (preset by knob 28) sufficient to trigger the output circuit of this counter, a hold signal is passed over line 27 and applied to the first slave control unit 22. Under normal conditions this slave unit receives a conventional signal for adjusting the PRV motor over line 41, and passes this signal over line 42 to the PRV motor, to increase or decrease the load on the compressor. For example the signal on line 41 could be received from a temperature sensor in the supply line of the chilled water unit, or from the return chilled water line. Alternatively sensors could be used in both the supply and return lines of the chilled water unit, and the difference between these temperatures used as the normal signal on line 41. When the signal on line 41 indicates that an increase-load signal should be passed over line 42, but there is a hold signal present conductor 27, the hold signal causes interruption of the circuit which would normally pass the increase-load signal over line 42 to the PRV motor. Under these conditions the compressor can remain in the normal condition, or it can be unloaded, but it cannot be additionally loaded while a hold signal is present on line 27.

If the customer's installation continues to consume energy at an excessive rate, so that the second counter 30 registers a total which indicates this condition, the reduce signal is provided on line 33 and passed to the first slave control unit 22. The reduce signal modifies the slave control unit to regulate the connections between lines 41 and 42 so that not ony is the compressor prevented from being additionally loaded, but the slave unit causes an unload signal to be passed over line 42 to the PRV motor.

An important feature of the present invention is the provision of a cycling timer or relay in the slave control unit, which includes an "on" time adjusting knob 43 and an "off" time adjusting knob 44. The adjusting relay operates in successive time periods when a reduce signal is received on line 33, to regulate the amount of time a reduce-load signal is applied over line 42 to the PRV motor. For example, with a reduce signal present on line 33, the setting of knob 43 can determine that the PRV motor is driven three seconds to reduce the opening of the vanes, and is then stationary (or in the hold condition) for 25 seconds. Both these times — the three second reduce (or "on") period and the 25 second hold (or "off") period — are adjustable by the knobs 43 and 44, respectively. This prevents the vanes from being driven closed too rapidly, avoids hunting in the system and likewise insures the system does not go into surge when the reduce-load signal is produced by the slave unit.

In this connection it is important to note that the second slave control unit 23 also has an "on" adjust knob 45 and an "off" adjust knob 46. This second slave unit also receives a hold signal over lines 27 and 47 from the first counter 24, when the hold signal is provided by the counter, and a reduce signal when present on line 33 is also passed over line 48 to the second slave control unit. Thus the modulating signal on line 50 for the modulating load (not shown) normally regulated by the signal on line 51 is controlled by the second slave control unit 23, under the regulation of the same master control unit 21. However, because the knobs 45 and 46 can be set differently than the knobs 43 and 44 on the first slave unit, the loads on the different centrifugal compressors (or other modulating loads) can be reduced at different rates. Thus a priority system of modulating load reduction can be incorporated simply by reducing the different on and off times for load reduction in the slave control units.

Another feature of the invention is the incorporation of a load shedding circuit 53. This can be simple relay arrangement so that, when the presence of a reduce signal on line 33 indicates excess power is being consumed, the load shedding circuit 53 drops out the contactors 16, 18 to deenergize the non-essential loads.

A safety and alarm circuit 54 is also provided, and is shown as a simple box although this can comprise a plurality of components and circuits. The circuit 54 monitors the power supply on the bus over input line 55; detects the continuity of the actual power usage signal on lines 35 and 56; receives another signal on line 57 to monitor the time interval during which a reduce signal is continually present; and, over line 58, monitors the continuity of the circuit between the master and slave, and between the master and any additional slaves that may be connected to the same master control unit. In addition to sounding an alarm, the safety and alarm circuit can open contactor 14 to drop the modulating load completely off the power bus, or open contactor 12 to interrupt transfer of any power from the utility to this particular installation.

Figure 4:
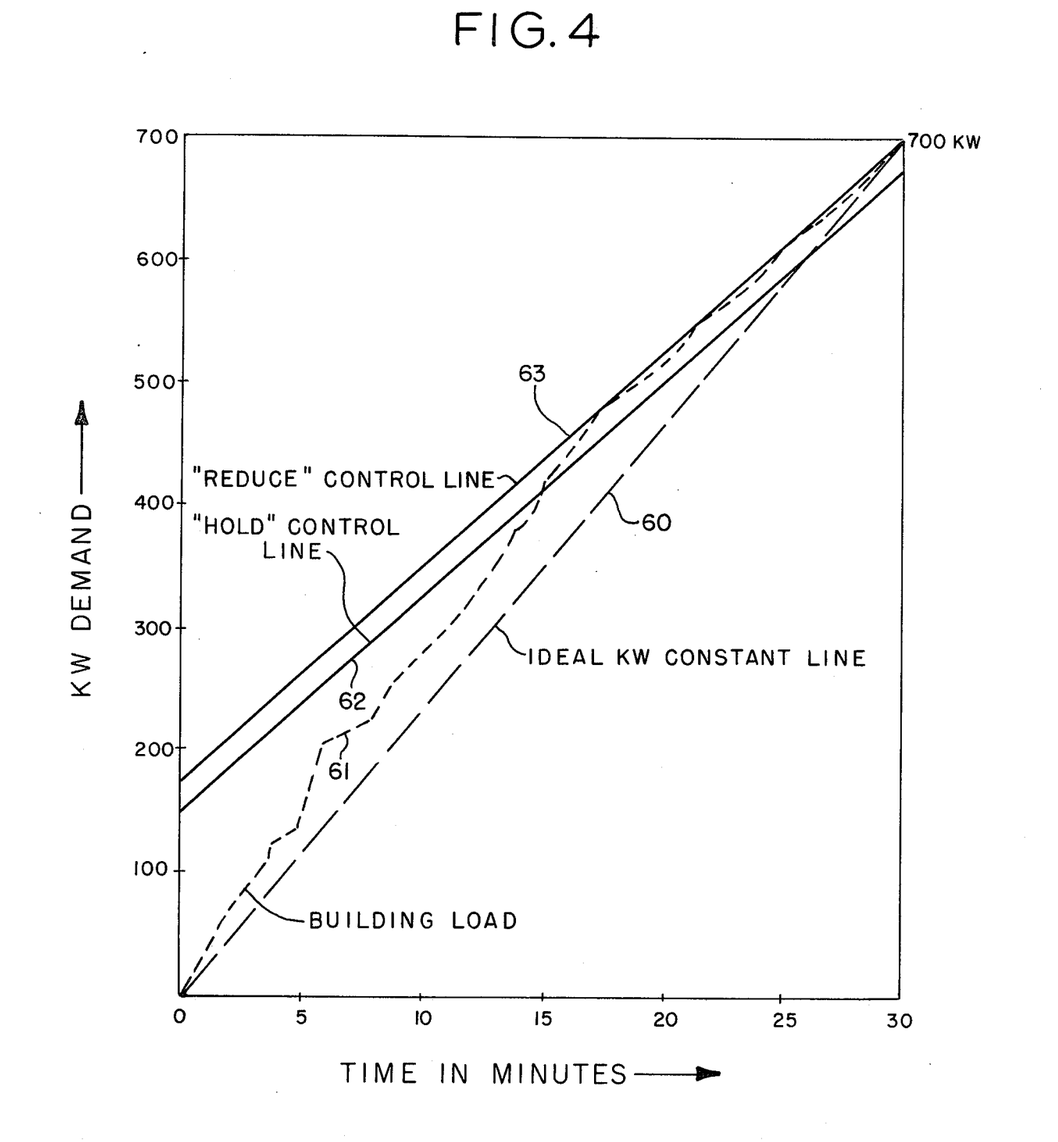
FIG. 4 is a graphical illustration useful in understanding the operation of the system shown in FIG. 3.

This demand limit operation may be better comprehended in connection with FIG. 4. This illustration depicts the operation of the system shown in FIG. 3 (and in more detail in FIGS. 5 and 6) to achieve the demand limiting exhibited in FIG. 2. For this explanation it is understood the demand upper limit is set at 700 kilowatts, and the time period is that from 12:45 p.m. to 1:15 p.m. in the 24-hour time interval represented in FIG. 2. Broken line 60 represents the ideal curve, or the ideal rate of power usage to consume exactly 700 kilowatts over the 30-minute time interval. Broken line 61 depicts the actual building load or the actual power consumption for this period. The "hold" control line 62 and the "reduce" control line 63 represent rates of power consumption which would first place the modulating load in a hold condition and thereafter cause load reduction, to stay within the 700 kilowatt limit. Thus after the line 61 intersects the line 62, the slave control unit operates to prevent a further load increase on the centrifugal compressor. When the dashed line 61 reaches the reduce control line 63, the load on the modulating unit is gradually reduced to be certain that the desired power consumption is not exceeded over this time period.

Figure 5:
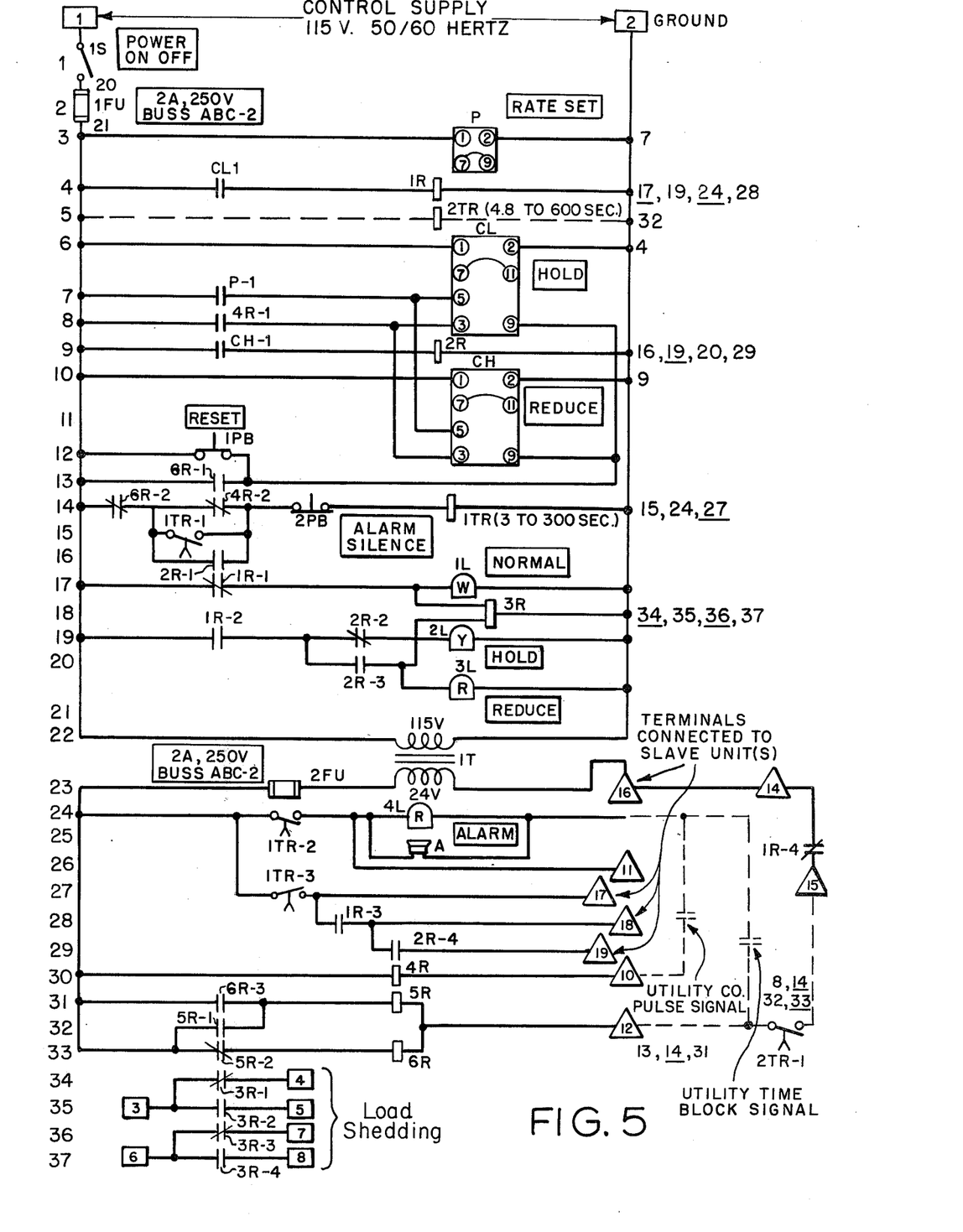
FIG. 5 is a wiring diagram of the master control unit used in a preferred embodiment of the inventive system.

FIG. 5 represents an actual master control unit, of the type shown more generally in FIG. 3, actually built and operated to implement the concepts of this invention. The symbols shown are the accepted IEC (International Electrical Commission) symbols, and thus those skilled in the art can readily implement the invention by following the teachings of FIGS. 5 and 6, without even grasping the underlying control concepts. For those more accustomed to schematic diagrams, the major adjustment to be made visually is that relay windings in the diagram are depicted as rectangles, such as the hold relay winding designated 1R just below the rate set or pulser unit P shown in the diagram. To facilitate an operating sequency understanding, line numbers are provided along the left margin of the diagram and, to the right of each control or relay unit, there are numbers designating the line or lines on which contacts regulated by the control unit are located. If the contact location is underlined, this signifies the contact set is normally closed.

Figure 6:
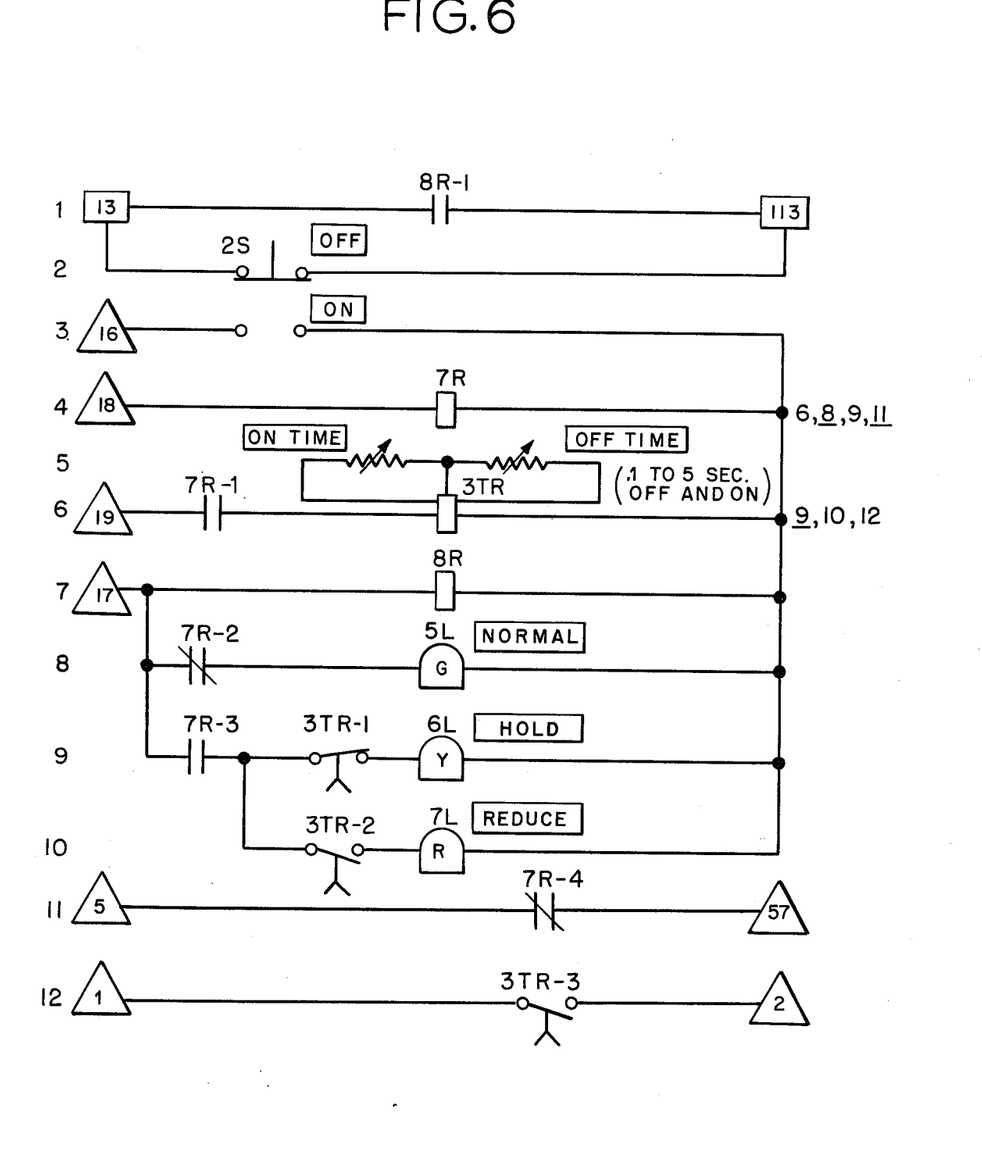
FIG. 6 is another wiring diagram, depicting one slave control unit as used in a preferred embodiment of this invention.

The contacts shown in a rectangle, such as 1 and 2 at the upper part of the diagram, are 115 volt terminal block contacts. Those in triangles in the lower right of the diagram, are 24 volt terminal blocks or contacts. The dashed lines indicate wiring to be supplied by others, to provide the signals represented by the lines 35 and 36 in FIG. 3. The pulser 37 of FIG. 3 is represented by the pulser P in FIG. 5 (adjacent the "rate set" legend). The encircled numbers represent terminal connections for a pulsing relay of the type supplied by Automatic Timing and Controls, such as their model 333-B. Each time the pulser P is energized, the contact set P-1 (line 7) is closed, applying a pulse to the number 5 contact of the hold relay CL and the reduce relay CH. These can be conventional Eagle Signal series 600 electronic counters, such as the CT601 or CT611, or other equivalent units. Thus closure of the contact set P-1 is equivalent to issuing a pulse from the pulser 37 in FIG. 3 and passing it to both the counters 24 and 30. Each time an actual power usage signal is received on line 35 in FIG. 3, that corresponds to receipt of a pulse at terminal 10 at the lower right of FIG. 5, energizing pulse relay 4R and closing the contact set 4R-1 in line 8 (the normaly closed contact set 4R-2 in line 14 is also opened at this time). The hold and reduce counters are reset whenever a time block signal is received at terminal 12 (line 32), energizing the signal block relays 5R and 6R. Closure of contact set 6R-1 in line 13 passes a reset pulse to the 9-terminal input of both relays, and these relays can also be reset by closure of the reset push button connected in parallel with the contact set 6R-1. Because different utilities have different duration time block signals, two time block relays 5R and 6R are connected to be operated by a signal from the utility at terminal 12. Both relays are operated, and relay 5R opens its contact set 5R-2 (line 33) to de-energize relay 6R. This insures the signal developed by contact set 6R-1 is always at the leading edge of the time block signal. It is emphasized that the contacts 16, 17, 18 and 19 in the lower right of FIG. 5 are those connected to the corresponding contacts in the slave control unit shown in FIG. 6. When contact set 7R-4 in line 11 of FIG. 6 is opened, the circuit to the PRV motor controlled by this slave unit cannot pass an increase-load signal to the PRV motor. When the contact set 3TR-3 on line 12 of FIG. 6 is closed, a reduce-load signal is passed to the associated PRV motor. When switch 2S in line 2 of FIG. 6 is closed, or if relay 8R in line 7 is energized, the statring circuit for the large motor which drives the centrifugal compressor can be controlled normally.

Although those skilled in the art can easily implement the invention from inspection of FIGS. 5 and 6, a brief operational description will be set out to assist in correlating those components with the general system arrangement shown in FIG. 3. When the system goes into hold and a hold signal is provided on line 27 of FIG. 3, this means the hold relay CL (FIG. 5) operates and closes contact set CL-1 in line 4, energizing relay 1R. The signal provided by hold relay CL in closing contact set CL-1 is in the nature of a control signal, and the additional relay 1R is provided because of the several functions that must be regulated. Relay 1R operates, and at its normally closed contact set 1R-1 (line 17) interrupts the energizing circuit for the "normal" lamp 1L; at its contact set 1R-2 (line 19) completes an energizing circuit for the "hold" lamp 2L; at its contact set 1R-3 (line 28) completes an energizing circuit which, over terminal 18 to the associated slave control unit (FIG. 6), energizes the slave relay 7R; and opens the contact set 1R-4 (FIG. 5) which, when terminals 14 and 15 are not jumpered, provides a function used in the "sliding window" control method to be described later.

Slave relay 7R (FIG. 6) is operated by closure of the contact set 1R-3 in the master just described above. In the slave unit operation of relay 7R closes contact set 7R-1 (line 6) but at this time there is no signal from the master unit on terminal 19 and thus the relay 3TR is not affected. Contact set 7R-2 (line 8) is opened to interrupt the energizing circuit for the "normal" lamp 5L; contact set 7R-3 (line 9) is closed to complete the energizing circuit for the "hold" lamp 6L; and contact set 7R-4 (line 11) is opened to interrupt the control line to the PRV motor, to prevent the application of an increase-load signal to this motor. It is noted that as soon as the push button 2S in the slave unit is displaced to the on position, a 24 volt energizing circuit is applied between the terminals 16 and 17 in the slave unit, in a manner apparent from considering the secondary winding circuit of the transformer 1T in FIG. 5. These are the more important functions which occur when the system operates in the hold mode.

If the rate of power consumption increases by an amount sufficient to energize the reduce relay CH (FIG. 5), this relay operates and closes contacts CH-1 (line 9). This energizes the relay 2R which, at its contact set 2R-1 (line 16) completes an energizing circuit for the alarm timer 1TR. The legend on the drawing indicates that this timer can be set to sound an alarm when the reduce signal is present continually for a period of from 3 to 300 seconds. As its contact set 2R-2 (line 19) the reduce relay interrupts the energizing circuit for the "hold" lamp 26, and at its contacts 2R-3 (line 20) it completes both an energizing circuit for the "reduce" lamp 3L and an energizing circuit for the latching load shedding relay 3R, which operates to control the contact sets shown at lines 34–37 and drop out the non-essential loads. This is also represented by the contactors 16, 18 in FIG. 3. In FIG. 5, the latching relay 3R will be dropped out when the system returns to the normal condition, and relay 1R is de-energized, allowing contact set 1R-1 to close again. Relay 2R in its operation also closes its contact set 2R-4 (line 29) and provides a signal over terminal 19 to the slave control unit (FIG. 6). Because the system had already gone into the hold condition and relay 7R in FIG. 6 was opened, contact set 7R-1 at line 6 of FIG. 6 was already closed, and an energizing circuit is now completed over terminal 19 for the timing relay 3TR in the slave unit. This analogous to passing the hold signal from counter 30 in FIG. 3 over line 33 to the slave unit. The knobs 43 and 44 for regulating the one and off times of the slave unit 5 in the hold condition shown in FIG. 3 are analogous to the variable resistors termed "on time" and "off time" in FIG. 6. As explained previously, relay 3TR actually transmits the reduce load signal by cosing its contact set 3TR-3 (line 12) for a brief time, regulated by adjusting of the "on time" variable resistor. The off time is regulated by adjusting the other variable resistor. In addition the energization of relay 3TR opens the contact set 3RT-1 (line 9) to de-energize the "hold" lamp 6L, and closes the contact set 3TR-2 (line 10) to complete an energizing circuit for the "reduce" lamp 7L in the slave unit. These are the main functions of the system in the reduce mode of system operation.

Referring now to the safety and alarm circuit 54 described generally in connection with FIG. 3, it is apparent that the alarm winding 1TR (FIG. 14) will be energized if 115 volts is present across this relay for up to five minutes, as set by an adjusting knob (not shown) on the relay. When this alarm relay operates, it closes an obvious hold circuit (1TR-1, line 15) and completes an energizing circuit by closing 1TR-2 (line 24). The symbol resembling the tail feathers of an arrow shown affixed to the 1TR-2 contact indicates this is an on-delay time delay relay. Likewise, after the delay time, contact set 1TR-3 (line 27) opens to prevent the application of either a hold or reduce signal to the slave unit when the master alarm relay 1TR is energized. If the master loses the pulse signals indicating power usage from the utility normally applied at terminal 10 (line 30), then the contact set 4R-2 (line 14) will not be periodically opened to interrupt the alarm relay circuit. A similar action would occur if the time block signal is lost and relay 6R is not periodically energized to open contact set 6R-2. Similarly if the master provides a reduce signal for too long a period, relay 2R is energized and contact set 2R-1 (line 16) is closed to complete the circuit for the alarm winding. If the 115 volt a-c energy normally supplied to the master is lost, there is no 24 volt energization over terminals 16 and 17 to the slave unit, and thus relay 8R in the slave unit cannot be energized to close contact set 8R-1 and allow normal energization of the motor driving the main compressor. Likewise this contact set cannot be closed if continuity between the master and slave is lost by interruption of the conductive paths between terminals 16 and 17.

For those installations where a time block signal is not available from the utility, or where it is desired not to operate on the utility time block signal but to regulate in the "sliding window" mode, then the utility time block signal is not connected to terminal 12 as shown but the timer relay 2TR (line 5) is connected as shown. It is apparent that energization of this relay will close the contact set 2TR-1 (line 32) when, and only when, the master is not in the hold or reduce mode of control. As soon as the hold counter CL is energized and operates relay 1R, the normally closed contact set 1R-4 (line 24) is opened to interrupt the circuit in series with the contact set 2TR-1. This means if the registers CL and CH are building up allowance pulses (that is, accumulating a count of the pulses from pulser P because power is not being consumed at the same rate as the preset limit rate), then these accumulated allowance pulses are "wiped out" by every actuation of the 2TR relay. This means the time "window" is not the arbitrary determination set by the utility company, but the system is continually regulating very close to the desired usage rate.

Technical Advantages

The present system allows the demand limiting in an electrical installation where a modulating load must be controlled without dropping it completely out and restarting it. Furthermore the system of the invention provides precise control of a critical load such as a centrifugal compressor, by reducing the load in small, controlled increments and without causing the system to hunt or go into surge. The system has been demonstrated to operate in a manner such that tenants in the controlled space did not notice the difference when the demand was limited in the manner described in connection with FIGS. 2 and 4. Although the power demand was only reduced by 13%, the savings achieved over the following year amounted to 45% because of this significant reduction in the demand charge for the customer's installation. It is important to emphasize that a plurality of modulating loads can be controlled by a signal master in accordance with this invention, and the different modulating loads can be set to reduce load at different rates by setting the on and off adjust knobs as described.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A demand regulating system for controlling the amount of power transferred over a power bus to an installation including at least one modulating electrical load which receives a load-regulating signal, comprising:

means for continually comparing the rate of actual power use against a desired rate of power use and for providing a hold signal when the actual rate exceeds the desired rate by a first amount, means for utilizing and hold signal to prevent additional loading of the modulating load, means for providing a reduce signal when the actual rate exceeds the desired rate by a second amount which is greater than the first amount, and means for utilizing the reduce signal to reduce the load on the modulating load.

2. A demand regulating system for controlling the amount of power transferred over a power bus to an installation including at least one modulating electrical load which receives a load-regulating signal, comprising:

means for continually comparing the rate of actual power use against a desired rate of power use and for providing a hold signal when the actual rate exceeds the desired rate by a first amount, means for utilizing the hold signal to prevent additional loading of the modulating load, means for providing a reduce signal when the actual rate exceeds the desired rate by a second amount which is greater than the first amount, and means for utilizing and reduce signal to reduce the load on the modulating load, in which said means for utilizing the reduce signal is operative in a given time period of reduce the load on the modulating load for only a fraction of that time period, allowing the system to stabilize during the remainder of that given time period.

3. A demand regulating system as claimed in claim 2, and in which means is provided for varying that fraction of the given time period during which the modulating load is reduced.

4. A demand regulating system for controlling the amount of power transferred over a power bus to an installation including at least one modulating electrical load which receives a load-regulating signal, comprising:

means for continually comparing the rate of actual power use against a desired rate of power use and for providing a hold signal when the actual rate exceeds the desired rate by a first amount, means for utilizing the hold signal to prevent additional loading of the modulating load, means for providing a reduce signal when the actual rate exceeds the desired rate by a second amount which is greater than the first amount, and means for utilizing the reduce signal to reduce the load on the modulating load, and in which said installation includes a second modulating electrical load which receives a second load-regulating signal, and in which additional means is provided for utilizing the hold and reduce signals to regulate the load on the second modulating electrical load.

5. A demand regulating system for controlling the amount of power transferred over a power bus to an installation including a modulating electrical load which also receives a load-regulating signal, comprising:

a master control unit, connected to continually compare the actual power usage rate at the installation against a desired rate of power usage, to provide a hold signal when the actual power usage rate exceeds the desired power usage rate by a first amount, and to provide a reduce signal when the actual power usage rate exceeds the desired power usage rate by a second amount greater than said first amount; and a slave control unit, connected to pass a load-increase or load-decrease regulating signal to said modulating electrical load under normal conditions, having first means connected to prevent application of a load-increase signal to the modulating load responsive to receipt of a hold signal from the master control unit, and having second means connected to apply a reduce-load signal to the modulating load responsive to receipt of a reduce signal from the master control unit.

6. A demand regulating system as claimed in claim 5, and in which said slave control unit is connected such that, upon receipt of the reduce signal from the master control unit, a reduce-load signal in passed to the modulating load only for a pre-set time, to allow the system to stabilize at the new load condition.

7. A demand regulating system as claimed in claim 6, in which said slave control unit includes first adjustable means, connected to vary the duration of the pre-set time during which the reduce-load signal is passed to the modulating load.

8. A demand regulating system as claimed in claim 7, and in which said slave control unit also includes second adjustable means, connected to vary the duration of the time period after said pre-set time during which no signal is passed to the modulating load, thus regulating the rate at which the modulating load is unloaded.

9. A demand regulating system as claimed in claim 8, in which said installation includes a second modulating electrical load, and a second slave control unit is coupled between said master control unit and the second modulating electrical load, said second slave control unit having first means connected to prevent application of a load-increase signal to the second modulating load responsive to receipt of a hold signal from the master control unit, and also having second means connected to apply a reduce-load signal to the second modulating load responsive to receipt of a reduce signal from the master control unit.

10. A demand regulating system as claimed in claim 9, and in which said second slave control unit is connected such that, upon receipt of the reduce signal from the master control unit, a reduce-load signal is passed to the second modulating load only for a pre-set time, to allow the system to stabilize at the new load condition.

11. A demand regulating system as claimed in claim 10, in which said second slave control unit includes first adjustable means, connected to vary the duration of the pre-set time during which the reduce-load signal is passed to the second modulating load.

12. A demand regulating system as claimed in claim 11, and in which said second slave control unit also includes second adjustable means, connected to vary the duration of the time period after said pre-set time during which no signal is passed to the second modulating load, thus regulating the rate at which the second modulating load is unloaded, which may be different than the rate at which the first modulating load is unloaded.

13. A demand regulating system as claimed in claim 5, and further comprising a protective contact set in said slave control unit, connected to complete an energization circuit for said modulating electrical load, such that said protective contact set is only closed responsive to normal energization of the master control unit from the power bus, and responsive to continuity of a circuit between the master control unit and the slave control unit to pass the hold and reduce signals from the master to the slave.

14. A demand regulating system as claimed in claim 5, in which the actual power usage rate is sensed by accumulating power usage pulses, and alarm relay means, connected for energization to sound an alarm if a power usage pulse is not received for a predetermined time period.

15. A demand regulating system as claimed in claim 5, and further comprising alarm relay means connected for energization to sound an alarm if the reduce signal is provided continuously for a predetermined time period.

16. A demand regulating system for controlling the amount of power transferred over a power bus to an installation including a modulating electrical load which also receives a load-regulating signal, comprising:

a master control unit, connected to continually compare the actual power usage rate at the installation against a desired rate of power usage, to provide a hold signal when the actual power usage rate exceeds the desired power usage rate by a first amount, and to provide a reduce signal when the actual power usage rate exceeds the desired power usage rate by a second amount greater than said first amount;

a slave control unit, connected to pass a load-increase or load-decrease regulating signal to said modulating electrical load under normal conditions, having first means connected to prevent application of a load-increase signal to the modulating load responsive to receipt of a hold signal from the master control unit, and having second means connected to apply a reduce-load signal to the modulating load responsive to receipt of a reduce signal from the master control unit; and in which said master control unit includes a hold relay connected to provide said hold signal, a normally-closed contact set associated with said hold relay, a blocking timer relay having a normally open contact set, which blocking relay is adjustable for periodic operation at a rate which is variable, and an equivalent time block signal generating circuit, including said normally closed contact set of the hold relay connected in series with said normally open contact set of the blocking timer relay, so that each operation of the blocking timer relay is effective to provide the equivalent of a time block signal when, and only when, the hold relay is not operated, thus wiping out any accumulated allowance pulses and affording sliding window operation.

17. A demand regulating system for controlling the amount of power transferred over a power bus to an installation including a modulating electrical load, comprising:
   a master control unit, comprising first and second up-down counters, means for applying to both counters an actual power usage signal denoting the amount of power transferred over the power bus, pulse means for applying a periodic signal denoting the desired rate of power usage to both counters, said first counter being connected to provide a hold signal when the first counter accumulates a first total indicating the desired power usage rate has been exceeded by a first amount, said second counter being connected to provide a reduce signal when the second counter accumulates a second total indicating the desired power usage rate has been exceeded by a second amount greater than said first amount; and
   a slave control unit, connected to pass a load-increase or load-decrease signal to said modulating electrical load under normal conditions, having first means connected to prevent application of a load-increase signal to the modulating load responsive to receipt of a hold signal from the first counter in the master control unit, and also having second means connected to apply a reduce-load signal to the modulating load responsive to receipt of a reduce signal from the second counter in the master control unit.

18. A demand regulating system as claimed in claim 17, and in which said slave control unit is connected such that, upon receipt of the reduce signal from the master control unit, a reduce-load signal is passed to the modulating load only for a pre-set time, to allow the system to stabilize at the new load condition.

19. A demand regulating system as claimed in claim 17, and in which said slave control unit comprises an adjustable relay, operative upon receipt of said reduce-load signal from the master control unit to pass the reduce-load signal to the modulating load only for an initial portion of a given time period, and to pass no signal to the modulating load during the remainder of the given time period, to afford a gradual reduction in the loading over a succession of time periods.

20. A demand regulating system as claimed in claim 19, in which the installation also includes a second modulating electrical load, and further comprising a second slave control unit also connected such that, upon receipt of the reduce signal from the master control unit, a reduce-load signal is passed to the second modulating load only for a pre-set time, to allow the system to stabilize at the new load condition.

21. A demand regulating system as claimed in claim 20, and in which said second slave control unit comprises an adjustable relay, operative upon receipt of said reduce-load signal from the master control unit to pass the reduce-load signal to the second modulating load only for an initial portion of a given time period, and to pass no signal to the second modulating load during the remainder of the given time period, to afford a gradual reduction in the loading over a succession of time periods at a rate which may differ from the unloading rate of the first modulating load.

22. A slave unit for regulating the loading of a modulating electrical load responsive to receipt of different load-regulating signals, including first means connected to prevent further loading of the modulating electrical load responsive to receipt of a first load-regulating signal, and second means connected to reduce the loading of the modulating electrical load responsive to receipt of a second load-regulating signal.

23. A slave unit for regulating the loading of a modulating electrical load responsive to receipt of different load-regulating signals, including first means connected to prevent further loading of the modulating electrical load responsive to receipt of a first load-regulating signal, and second means connected to reduce the loading of the modulating electrical load responsive to receipt of a second load-regulating signal, and in which said second means includes a device which operates, responsive to receipt of the second load-regulating signal, to reduce the loading of the modulating electrical load for a fraction of a given time period and allow the load to stabilize for the remainder of the given time period, thus allowing the load to stabilize at the reduced load condition in each given time period.

24. A slave unit as claimed in claim 23, and in which said device is an adjustable unit, variable to regulate that fraction of the given time period during which the load of the modulating electrical load is reduced.

25. For use in a demand regulating system wherein electrical energy passed to a modulating electrical load is expended at an actual power usage rate which may at times exceed a preset desired power usage rate, a control unit comprising:
   first means connected to prevent application of a load-increase signal to the modulating load when the actual power usage rate exceeds the desired power usage rate by a first amount; and
   second means connected to apply a reduce-load signal to the modulating load when the actual power usage rate exceeds the desired power usage rate by a second amount which is greater than said first amount.

26. For use in a demand regulating system wherein electrical energy passed to a modulating electrical load is expended at an actual power usage rate which may at times exceed a preset desired power usage rate, a control unit comprising:

first means connected to prevent application of a load-increase signal to the modulating load when the actual power usage rate exceeds the desired power usage rate by a first amount;

second means connected to apply a reduce-load signal to the modulating load when the actual power usage rate exceeds the desired power usage rate by a second amount which is greater than said first amount; and in which said control unit is connected such that said reduce-load signal is passed to the modulating load only for a fraction of a given time period, to allow the system to stabilize at the new load condition.

27. A control unit as claimed in claim 26, in which said control unit includes first adjustable means, connected to vary the duration of the fraction of the given time period during which the reduce-load signal is passed to the modulating load.

28. A control unit as claimed in claim 27, and in which said control unit also includes second adjustable means, connected to vary the duration of the remainder of the given time period after said fraction during which no signal is passed to the modulating load, thus regulating the rate at which the modulating load is unloaded.

29. The method of regulating electrical energy demand at an installation including a modulating electrical load which utilizes power at an actual rate which may exceed a pre-set desired rate, comprising the following steps:

continually comparing the actual rate and the desired rate;

establishing a hold condition, in which the modulating load cannot be further loaded, when the actual rate exceeds the desired rate by a first amount; and establishing a reduce condition, in which the load on the modulating load is gradually reduced, when the actual rate exceeds the desired rate by a second amount which is greater than the first amount.

30. The method of regulating electrical energy demand at an installation including a modulating electrical load which utilizes power at an actual rate which may exceed a pre-set desired rate, comprising the following steps:

continually comparing the actual rate and the desired rate;

establishing a hold condition, in which the modulating load cannot be further loaded, when the actual rate exceeds the desired rate by a first amount;

establishing a reduce condition, in which the load on the modulating load is gradually reduced, when the actual rate exceeds the desired rate by a second amount which is greater than the first amount; and comprising the additional step of adjusting the rate at which the load on the modulating electrical load is reduced.

31. The method of regulating electrical energy demand as set out in claim 30, as applied to an installation which also includes a second modulating electrical load, comprising the additional steps of gradually reducing the load on the second modulating load when the reduce condition is established, and adjusting the rate at which the load on the second modulating electrical load is reduced, which reduction rate may differ from the reduction rate of the first modulating electrical load.

* * * * *

UNITED STATES PATENT OFFICE
CERTIFICATE OF CORRECTION

PATENT NO. : 4,117,537
DATED : September 26, 1978
INVENTOR(S) : Paul W. Muench

It is certified that error appears in the above-identified patent and that said Letters Patent are hereby corrected as shown below:

Claim 1, column 10, line 45, cancel "and" and insert -- the --.

Claim 2, column 10, line 65, cancel "and" (second occurrence) and insert -- the --.

Claim 6, column 11, line 56, cancel "signal in" and insert -- signal is --.

Signed and Sealed this

Fifteenth Day of May 1979

[SEAL]

Attest:

RUTH C. MASON
Attesting Officer

DONALD W. BANNER
Commissioner of Patents and Trademarks